US005529186A

United States Patent [19]
Bass

[11] Patent Number: 5,529,186
[45] Date of Patent: Jun. 25, 1996

[54] BOXED PAY-OUT REEL FOR OPTIC FIBER CABLE OR WIRE OR THE LIKE, WITH SMOOTH PAY-OUT, HIGH-IMPACT AND CABLE END HOLDING FEATURES

[75] Inventor: Benjamin A. Bass, Omaha, Nebr.

[73] Assignee: AT&T Corp., Murray Hill, N.J.

[21] Appl. No.: 353,014

[22] Filed: Dec. 9, 1994

[51] Int. Cl.⁶ .................................................. B65D 85/04
[52] U.S. Cl. ......................... 206/395; 206/409; 229/185; 242/613.1
[58] Field of Search ..................................... 206/397, 408, 206/409, 495, 413, 416, 389, 395, 396; 242/588.4, 588.6, 613.1; 229/117, 185

[56] References Cited

U.S. PATENT DOCUMENTS

| | | | |
|---|---|---|---|
| 889,109 | 5/1908 | Davidson | 229/185 |
| 922,695 | 5/1909 | Haas | 206/408 |
| 2,799,458 | 7/1957 | Nye | 242/118.8 |
| 2,822,992 | 2/1958 | Moulden | 242/137.1 |
| 2,991,958 | 7/1958 | Eifrid | 242/137.1 |
| 3,114,495 | 12/1963 | Grooms | 229/185 |
| 3,352,410 | 11/1967 | Salladay et al. | 206/408 |
| 3,680,810 | 8/1972 | Jarmalow | 206/408 |
| 4,244,254 | 1/1981 | Fish | 206/395 |
| 4,817,796 | 4/1989 | Camillo et al. | 206/395 |
| 4,884,690 | 12/1989 | Klenter et al. | 206/416 |
| 5,150,789 | 9/1992 | Bass | 242/163 |

FOREIGN PATENT DOCUMENTS

| | | | |
|---|---|---|---|
| 647592 | 8/1962 | Canada | 206/409 |

Primary Examiner—Jimmy G. Foster

[57] ABSTRACT

A boxed spool assembly of the present invention includes a spool assembly, a pair of end plates for supporting the spool assembly for rotation, and a box in which the spool assembly and end plates are placed. The bottom of the box is self-locking and requires no tape. Further, the box is constructed so that the overlapping of multiple layers of corrugated fiberboard is avoided in the bottom of the box so that the spool assembly can rotate without interference. The box includes starburst cuts to hold the loose end of cable or wire wound on the spool assembly so that a user can readily locate the loose end. One starburst cut has a slit communicating with a horizontal slot. Cable or wire can be paid-out or held in position by pulling the cable to the slot or starburst cut, respectively, by the slit. The end plates include polycarbonate material and have openings corresponding with openings in the box, to provide handholds for the user. The end plates have arbors protruding away from the plate surfaces of the end plates to hold flanges of the spool assembly away from the end plates for frictionless rotation. The arbors of the end plates that support the spool assembly have annular flat ledge surfaces to confine the flanges of the spool assembly away from the end plates. The protrusions of the arbors are drafted or tapered to cause the spool assembly to be centered in the box and to ride away from the end plates. Corner supports are provided on the end plates to prevent the corners of the end plates from cutting through the box and also to maintain the box in the proper configuration. The arbors and corner supports include rib reinforcements. The boxed spool assembly is sized in accordance with industry standard shipment sizes.

34 Claims, 5 Drawing Sheets

BOXED PAY-OUT REEL FOR OPTIC FIBER CABLE OR WIRE OR THE LIKE, WITH SMOOTH PAY-OUT, HIGH-IMPACT AND CABLE END HOLDING FEATURES

BACKGROUND OF THE INVENTION

1. Field of the Invention

This invention is directed to the packaging of cable, wire or the like on a spool or reel contained within a box.

2. Description of the Invention

Several packaging apparatuses have been used to contain optic fiber cable, wire and the like for shipping and storage. Among these packaging apparatuses is the REELEX® system. In the REELEX® system, wire or optic fiber cable is coiled inside a box and fed outside of the box through a tube attached to the box's side. An installer pulls on the end of the wire or optic fiber cable to draw a desired length of cable or wire out of the box. Unfortunately, the REELEX® system is subject to tangling as wire or cable is drawn therefrom. The tangling often requires the installer to tear open the box to disentangle the wire or cable. Particularly with optic fiber cable that contains relatively fragile optic fibers, such tangling can even damage the optic fiber cable and render it unusable.

Other packaging apparatuses include a reel or spool contained within a box. In many of these boxed reel systems, a pay-off stand is required to support the reel at its axis so that optic fiber cable or wire can be pulled from the reel as the reel rotates. However, the pay-off stand must be carried, assembled and disassembled by the installer. Accordingly, the pay-off stand and boxed reel combination is a cumbersome system for the installer to use. Another concern with the pay-off stand and boxed reel systems is that the pay-out of wire or optic fiber cable may not be smooth if the spool is not properly aligned on the pay-off stand. Particularly, when optic fiber cable is used, a rough pay-out can be damaging to fragile optic fibers.

Another boxed reel system uses a containing corrugated fiber box to support the reel of wire or cable (see, e.g., U.S. Pat. No. 2,822,992). Particularly if the reel of wire or cable is heavy, the strength of the corrugated fiber box can be insufficient to support the weight of the reel. Thus, the reel may damage the corrugated fiber box and render the boxed-reel system inoperative.

Another type of boxed reel system includes a corrugated fiberboard box with a taped bottom, masonite end plates supporting a wooden dowel, and a chipboard spool rotatably mounted on the wooden dowel. Still another form of packaging related to that described immediately above includes a corrugated fiberboard box with a taped bottom, thick polyethylene end plates and a plywood reel. The taping of the bottom of the fiber board box noted above requires appreciable labor (and therefore cost) in construction of the above-described boxed reel systems. Also, the use of the masonite or thick polyethylene end plates with chipboard or plywood reel produces a heavy boxed-reel system that is cumbersome for an installer or user to transport to an installation site. Further, the boxed reel system using the masonite end plates with the wooden dowel suffers from the disadvantage that the wooden dowel tends to fall out of engagement with the masonite end plates.

Another problem that has been recognized in boxed-reel systems is the tendency for the end of the optic fiber cable, wire or the like to inadvertently retreat inside of the box, a situation causing considerable frustration and time for the installer who must tear open the box to retrieve the end of the cable or wire.

SUMMARY OF THE INVENTION

The above-noted deficiencies are overcome by the invention herein disclosed. Briefly stated, the present invention includes a box, a pair of end plates and a spool with flanges mounted to the ends of the spool with respective end plugs. Wire, optic fiber cable or the like are wound onto the spool and prevented from slipping off the spool at either end by the flanges. The flanges are fixed in position to the ends of the spool by respective end plugs. The end plugs are recessed or apertured to rotatably receive respective arbors of the end plates. The end plates thus rotatably support the spool. The end plates, end plugs, flanges and loaded spool are placed in the box and enclosed therein. Advantageously, the box is self-locking so that no tape is required to hold the box in the proper configuration, thus eliminating the labor and cost associated with taping a box to hold a desired shape. Also, the box of the present invention is cut from a corrugated fiber board blank such that the stocking of plural layers of corrugated fiberboard is avoided where possible in the bottom of the box, so that the flange edges or cable or wire and the like on a fully-loaded spool, will not tend to rub against the bottom of the box. Further, the box has a perforated horizontal slot that can be punched open with a user's finger and pulled to tear open a horizontal slot through which the optic fiber cable or wire contained within the box, can be smoothly fed. To eliminate the task of opening the box to find the loose end of the cable, wire or the like, the box of the present invention includes a starburst cut through which a cable is inserted to extend out of the box, and another starburst cut through which the loose end is fed back into the box before closing the box for shipping. This feature allows the installer or user of the wire, cable, etc., to quickly find the loose end and also prevents the loose end from tangling to be damaged or hung-up during shipment. Advantageously, the box also includes a slit running from the slot to one of the starburst cuts so that the user or installer can smoothly pull cable or wire, etc. from the reel through the slot and pull the cable or wire, etc. downward in the slit to the starburst cut so that it is held without slipping by the box at the starburst cut. This feature thus avoids the frustrating, time consuming task of tearing open the box to find the loose end when it inadvertently retracts into the box.

In addition, the end plates of the present invention are advantageously formed of polycarbonate that is lightweight, yet highly resilient to impact. The end plates have openings corresponding to openings in the box, that allow a user to use fingers to lift both the box and the end plates supporting the spool. Each end plate advantageously includes an arbor with a ledge surface that provides a smooth, continuous surface so that the ends of the spool smoothly rotate even if they come into contact with the flat ledge surfaces of the arbors. The flat ledge surface also spreads impact more evenly over the end plate. The arbors of the end plates have a draft (of 2°, for example) that causes the spool to tend to ride in the middle of the box away from the end plates so that the end plates apply relatively little friction to the flanges, or end plugs. This feature of the present invention smoothes the pay-out of wire, optic fiber cable, etc. from the spool. Further, the arbor is mounted to protrude outward away from the respective end plates to reduce friction applied by the end plates to further improve the smoothness of the pay-out of the wire, optic fiber cable, etc. in the present invention. Corner supports are provided on the corners of the end plates to eliminate relatively thin edges that could cut through the corrugated fiberboard box. Also, the corner supports keep the sides of the box from settling to a position where the sides would apply friction to the edges of the flanges or wire, optic fiber cable, etc. in a loaded spool. The corner supports also provide impact resistance by strengthening the corners of the end plates and also by holding the sides of the box in a position in which they can absorb impact by bending inward. Further, the arbor and corner plates are reinforced with ribs that tend to strengthen the arbor and corner plates and also help to distribute impact over a larger area of the end plates. In addition, in accordance with this invention, the box, end plates and spool assembly including flanges, end plugs and spool, are sized and configured so that the spool assembly will not slip out of the end plates. Further, in accordance with the present invention, the box, end plates, end plugs, flanges and spool loaded with optic fiber cable, wire or the like, are sized to conform to industry-standard shipping sizes.

These together with other objects and advantages of the present invention, which will become subsequently apparent, reside in the details of construction and operation as more fully hereinafter described and claimed, reference being had to the accompanying drawings, forming a pan hereof, wherein like numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

DESCRIPTION OF THE PREFERRED EMBODIMENTS

Figure 1:
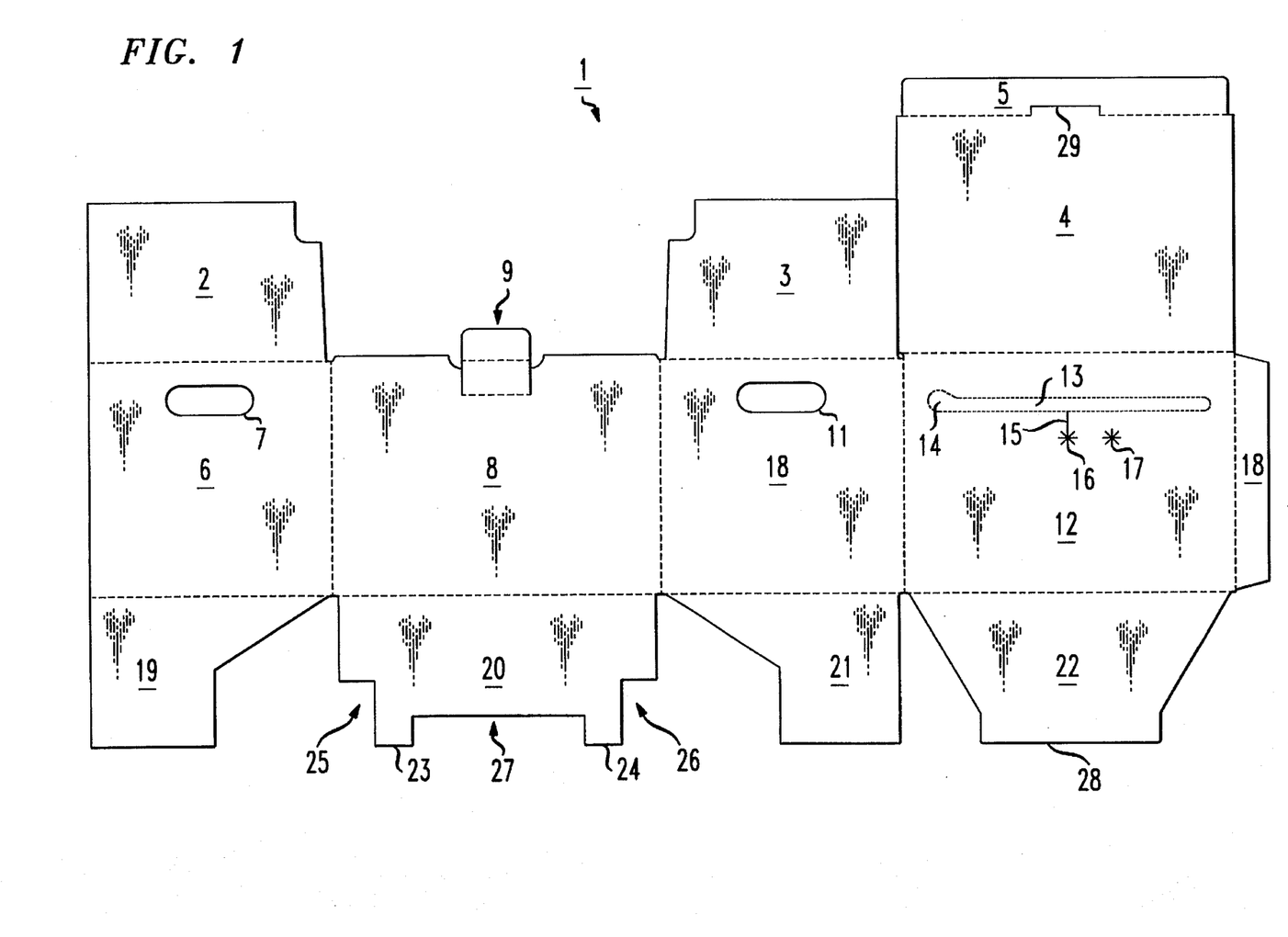
FIG. 1 is a top plan view of a blank for a box in accordance with the present invention.

FIG. 1 is a top plan view of a blank for a box 1 in accordance with the present invention. Preferably, the blank is made from corrugated fiberboard or the like. In FIG. 1, the solid lines represent cut edges of the blank for the box 1, the relatively long broken lines represent fold lines (such as score lines) and the relatively short broken line represents a perforated line.

The blank includes top flaps 2, 3, a top lid 4 and a lid flap 5. The blank also includes a side panel 6 with an opening 7 cut therein, a side panel 8 having a folding tab 9, a side panel 10 with an opening 11 cut therein, and a side panel 12. The side panel 12 includes a slot 13 that is horizontal and defined by perforations in the side panel 12. At one end of the slot 13, a punch hole area 14 is defined by an area of the slot 13 that is wider than the remainder of the slot 13. The punch hole area 14 allows a person to open the slot 13 by pushing with a finger against the punch hole area 14 inwardly of the box 1 to break the perforation, and by using fingers to pull outwardly of the box 1 to tear out the fiberboard piece covering the slot 13. Importantly, a slit 15 is cut vertically from a lower edge of the slot 13 to a starburst cut 16. The starburst cut 16 is an asterisk-shaped cut in the side panel 12. The slit 15 and the starburst cut 16 can be used to prevent a loose end of the optic fiber cable or wire, for example, stored in the box 1, from inadvertently retracting into the box 1. To prevent the loose end of an optic fiber cable, wire, etc. from dangling to be damaged, tangled or hung-up during shipment, a second starburst cut 17 is cut in the side panel 12. Before closing the box 1 for shipment, the loose end of the optic fiber cable (or wire, for example) can be fed out of the box 2 through the starburst cut 16 and then back into the box 1 through the starburst cut 17. Thus, the loose end of the optic fiber cable (or wire, etc. ) will not be hung-up, damaged or tangled during shipment, and yet will be readily available to an installer or other user of the boxed cable, wire, etc. without the need to open the box 1 to fish out the loose end of the cable, wire, etc. The box 1 also includes a side flap 18 used to hold the box 1 together.

The box 1 further includes bottom flaps 19, 20, 21, 22 that enclose the bottom of the box 1 when properly folded. Importantly, the bottom flap 20 has two protruding tabs 23, 24. Outside of each tab 23, 24 are cutaway portions 25, 26, and in between the tabs 23, 24 is a cutaway portion 27. As so configured, the tabs 23, 24 are sufficient to hold the bottom of the box 1 together when correctly folded, and the cutting of the bottom flap 20 to eliminate the cutaway portions 25, 26, 27 avoids the unnecessary overlapping of the plural layers of fiberboard in the bottom of the box 1 when the box 1 is folded. Thus, neither the spool assembly nor the wire, optic fiber cable or the like wound on the spool assembly (particularly when fully-loaded on the spool) rub against the bottom of the assembled box 1 so that the payout of wire, optic fiber cable, etc. is relatively smooth.

The blank of FIG. 1 is folded into the assembled box 1 by folding by approximately 90° the blank between the side panels 10, 12 and between the side panel 12 and the side flap 18. The inner surface of the side flap 18 is adhered and/or stapled to the outside surface of the side panel 6 near the cut edge thereof. The bottom of the box 1 is assembled by folding by approximately 90° the bottom flap 20 at the fold line separating the bottom flap 20 and the side panel 8. Next, the bottom flaps 19, 21 are folded inward about 90° to contact the panel 20, and the bottom flap 22 is folded inward about 90° to contact the bottom flaps 19, 20, 21. A tab 28 of the bottom flap 22 can be slipped inward of the box 1 on the surface of the bottom flap 20 inside of the box 1 and adjacent to the cutaway portion 27. Importantly, the bottom of the box 1 is self-locking so that no tape or the like is required to hold the bottom of the box 1 closed. Thus, significant labor and associated cost is reduced with the self-locking bottom of the box 1 by eliminating the need to tape the box bottom.

Before closing the top of the box 1 preparatory to shipment, a spool assembly with optic fiber cable, wire or the like wound thereon together with supporting end plates, are placed inside of the box 1.

The top of the box 1 is assembled by folding the top flaps 2, 3 inward about 90° at respective fold lines, to close the top of the box 1. The top of the box 1 is entirely closed by folding about 90° the top lid 4 at its fold line to cover the top of the box 1. The top lid 4 can be locked into position by bending the lid flap 5 about 90° and tucking the lid flap 5 inside of the box 1 to rest against the inside of the side panel 8. By bending the lid flap 5, a slot 29 is formed. The folding tab 9 is folded outwardly of the box 1 at the lower folding line in FIG. 1, then bent at the upper folding line inward and inserted into the slot 29 to hold the top lid 4 and thereby the top flaps 2, 3 to enclose the top of the box 1.

In FIG. 1, the preferred dimensions of the blank for the box 1 are 49⅛" in the horizontal direction and 28⁵⁄₃₂" in the vertical direction. With the preferred dimensions, the box 2 is roughly 10⅛" across a minor side, 13¾" across a major side and 10⅜" in height. These dimensions make possible the efficient stacking of the boxes 1 for industry shipping sizes using standard pallets. More specifically, a 42"×42" pallet can be loaded with the minor sides of 4 boxes on one side (4 boxes roughly 10½" per minor box side=42" pallet side). The major sides of the boxes 1 can be loaded three across on the other side of the pallet (3 boxes roughly 13¾" per major box side=42" pallet side). Thus, a 42"×42" pallet can hold 12 boxes in one layer. Preferably, the boxes are stacked 4 boxes high in four layers. Thus, a total of 48 boxes can be carried on industry-standard pallet with very little (if any) wasted space, thus solving a space efficiency problem that had long existed in optic fiber cable picking and shipping industry.

Figure 2A:
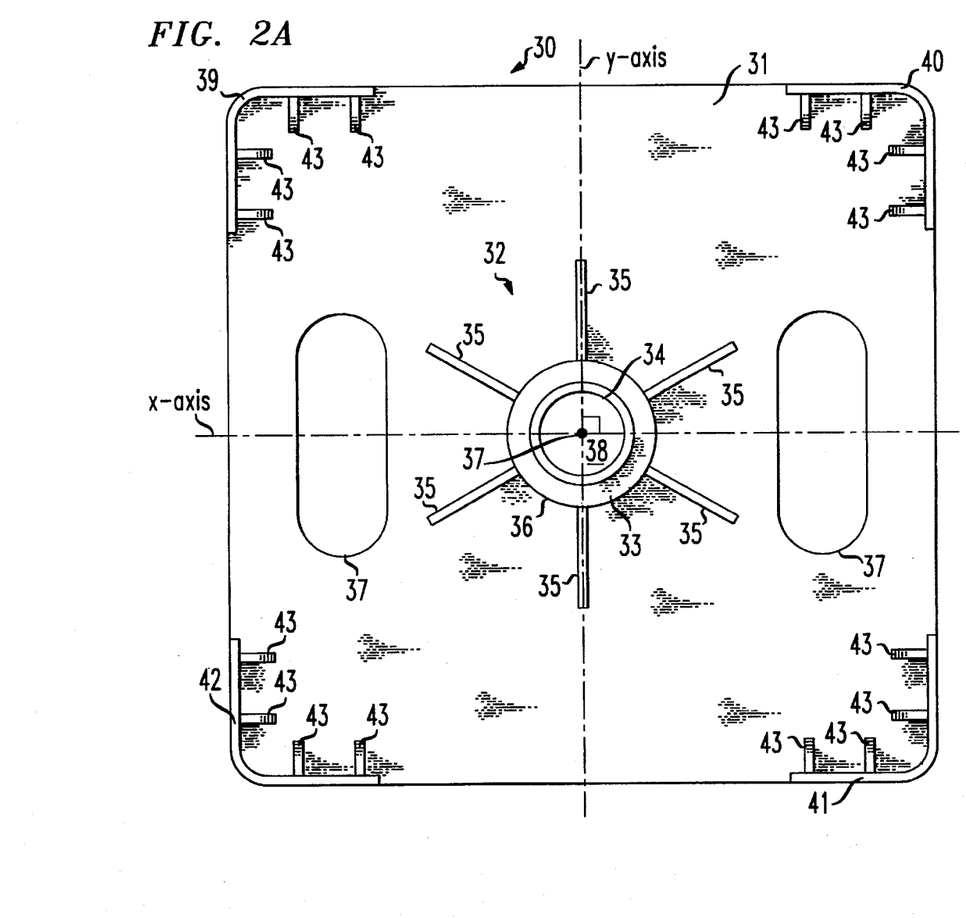
FIG. 2A is a first side view of an end plate in accordance with the present invention.

FIG. 2A is a first side view of an end plate 30 in accordance with the present invention. The end plate 30 is structured and functions to support an end of the spool assembly yet to be described in detail. Of course, because the spool assembly has two ends, two end plates 30 are needed to support the spool assembly. Preferably, the end plate 30 is formed of a material such as polycarbonate, that is light-weight to ease in the transport of the boxed spool system of the present invention, but also that is a high-strength material resistant to significant impact to protect the optic fiber cable, wire or the like.

The end plate 30 includes a plate 31 with an arbor 32 centered thereon. Preferably, the arbor 32 is formed with the plate 31 so that no seams or the like exist that could provide a preferential break line tending to weaken the structure of the end plate 30. The arbor 32 primarily serves to support and position an end of the spool assembly of the present invention. More specifically, the arbor 32 serves as a means for maintaining the spool assembly in a spaced relationship from respective surfaces of the plates of two end plates 30 supporting the spool assembly. Radiating from the side of the arbor 32 are six support ribs 35 integrated with the side of the arbor 32 and the end plate 30, that serve to support the arbor 32 and also to spread any impact against the arbor 32 across a larger area of the end plate 30, thus providing structural strength for both the arbor 32 and the plate 31.

Figure 2B:
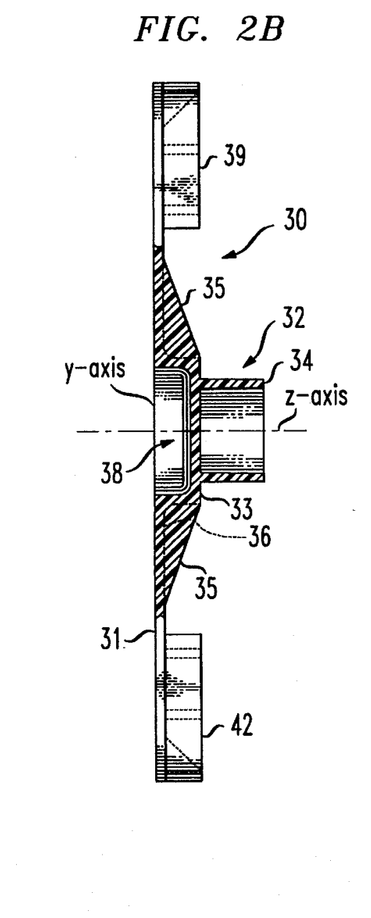
FIG. 2B is a second side view in partial cross-section of the end plate of FIG. 2A.

The arbor 32 protrudes perpendicularly away from the major surface of the plate 31 as best seen in FIG. 2B. The arbor 32 has a flat annular ledge surface 33 that serves to restrict the spool assembly away from the plate 31 so that the side of the spool assembly does not rub against the plate 31. In addition, the flat annular ledge surface 34 tends to spread impact across a relatively large area so that the arbor 32 can withstand significant shock or impact. Also, the ledge 33 has a flat surface (as best seen in FIG. 2A) that allows the spool assembly to rotate smoothly in the event that the spool assembly makes contact with the flat annular ledge surface 33. Normally, however, the spool assembly will tend to ride (i.e., rotate) on a protrusion 34 of the arbor 32. This tendency advantageously occurs in the present invention because the box 1 is sized to provide space between the ledge surfaces 33 of the top end plates 30 supporting respective ends of the spool assembly when placed in the box 1, and also because the protrusions 34 of the two supporting end plates 30 have a draft of about 2° (of course, other drafts or tapers can be used without departing from the scope of the invention) sloping inward toward the geometric centers of the spool assembly and the box 1. In other words, the protrusion 34 has a shape conforming to a cone cut perpendicular to its longitudinal axis by two parallel planes. Thus, the diameter of the protrusion 34 at the part furthest away from the plate 31 is less than the diameter of the protrusion 34 in close proximity to the ledge surface 33. Thus, the force of gravity tends to slide the ends of the spool assembly away from the ledge surfaces 33 of respective end plates 30 so that the spool assembly is more or less centered in the box 1 and supported by the protrusions 34. The payout of optic fiber cable, wire or the like, from the spool assembly is thus made very uniform and smooth in the present invention. Thus, tangling or breakage of wire or optic fiber cable or the like is virtually eliminated with the present invention.

Radiating from the cylindrical side 36 of the arbor 32 are six support ribs 35 that are preferably integrally formed with the arbor 32 and the plate 31. As best seen in FIG. 2B, the support ribs 35 meet with and are integrated to the cylindrical surfaces of the arbor 32 and are sufficiently wide in proximity to arbor 32 to just meet with the annular ledge surface 34 of the arbor 32. Referring to FIG. 2B, the support ribs 35 taper in a direction radially outward from the cylindrical side 36 of the arbor 32, where the support ribs 35 are supported by the plate 31. The support ribs 35 are thus triangular in shape, tending to be relatively flexible at the extremities furthest from the arbor 32, and tending to be relatively rigid at the portion closer to the cylindrical side 36 of the arbor 32. This triangular configuration of the support ribs 35 tends to firmly support the arbor 32 and yet provide sufficient flexibility to aid in absorbing impact.

As best seen in FIG. 2A, the protrusion 34, the ledge surface 33 and the cylindrical surface 36 are coaxial about the Z-axis extending perpendicularly out of the plane of the sheet in FIG. 2A. The area inside of the inner surfaces of the protrusion 34 and the cylindrical side 36 are hollow to avoid unnecessary use of polycarbonate material in hollow area 38.

The end plate 30 has two openings 37 formed in the plate 31. The end plate 31 is placed in the box 1 so that one of the openings 37 is aligned with one of the openings 7, 11 on a respective inner side panel 6, 10 of the box 1. Therefore, a user can readily transport the box 1 by inserting the fingers of each hand through openings 7, 11 and also through one of the openings 37 of the two end plates 31 positioned inside of the box 1 adjacent to the inner side panels 6, 10. Thus, the user lifts the boxed spool assembly of the present invention not only by the box 1 (which could tear if forced to bear the weight of the entire boxed spool assembly), but also by the two end plates 31 inside of the box 1. Consequently, the user is assured that the boxed spool assembly of the present invention will be well-supported and secure when the user carries the boxed spool assembly.

The end plate 31 advantageously includes corner supports 39, 40, 41, 42 that are preferably formed integrally with the plate 31. The corner supports 39–42 are angled strips of polycarbonate that meet with and extend along the corners of the plate 31 (as better seen in FIG. 2A) and also protrude outwardly from the surface of the plate 31 in the Z-axis direction (as best seen in FIG. 2B). The corner supports 39–42 are rounded with the plate 31 at the corners to eliminate sharp edges that would otherwise exist. The rounded edges of the corner supports 39–42 distribute the weight supported by the end plate 31 more evenly at the corners thereof so that the end plate 31 will not tend to cut through the box 1 as compared to sharp-edged corners. The corner supports 39–42 extend in the Z-axis direction to eliminate an otherwise thin edge that would tend to cut through the box 1 when handled. The extension of the corner supports 39–42 in the Z-axis direction thus helps to distribute the load supported by the end plate 31 more evenly at the corners of the box 1. Further, the corner supports 39–42 support the major side panels 8, 12, the bottom flaps 19, 20, 21, 22, the top flaps 2, 3 and the top lid 4, to maintain their proper configuration so that surface of the box 1 will not tend to interfere with the spool assembly to adversely affect the payout of optic fiber cable, wire or the like wound on the spool assembly. Also, the corner supports 39–42 hold the major side panels 8, 12, the bottom flaps 19, 20, 21, 22, the top flaps 2, 3 and the top lid 4, in a position away from the spool assembly so that, if impacted by an object, the surfaces of the box 1 mentioned immediately above will tend to flex to absorb the impact, thus reducing or preventing impact on the spool assembly.

For reinforcement, the corner supports 39, 40, 41, 42, have two spaced support ribs 43 provided along each of the X-and Y axis directions (as best seen in FIG. 2A). The support ribs 43 are triangular in shape and have one side meeting with the plate 31 and the other side meeting with a respective corner support 39, 30, 41, 42. The support ribs 43 are perpendicular to the plate 31 and also to the side surface of the respective corner support 39, 40, 41, 42. The use of the support ribs 43 not only provides structural strength for the corner supports 39, 40, 41, 42, but also generally strengthens the end plate 30.

Preferably, the end plate 30 is 9.94" across each side, as shown in FIG. 2A. This dimension will allow the end plate 30 to properly fit in the box 1 with dimensions as indicated with respect to the box 1 with reference to FIG. 1.

Figure 3A:
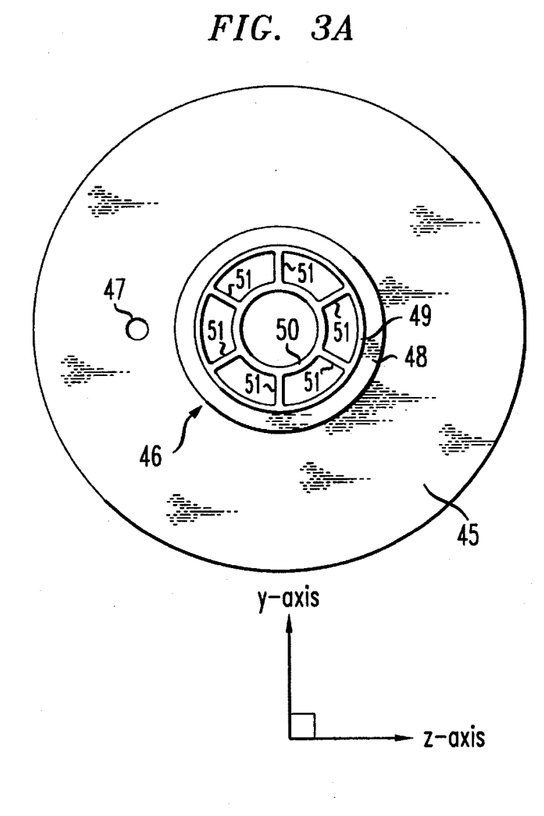
FIG. 3A is a first side view of a spool assembly in accordance with the present invention.
Figure 3B:
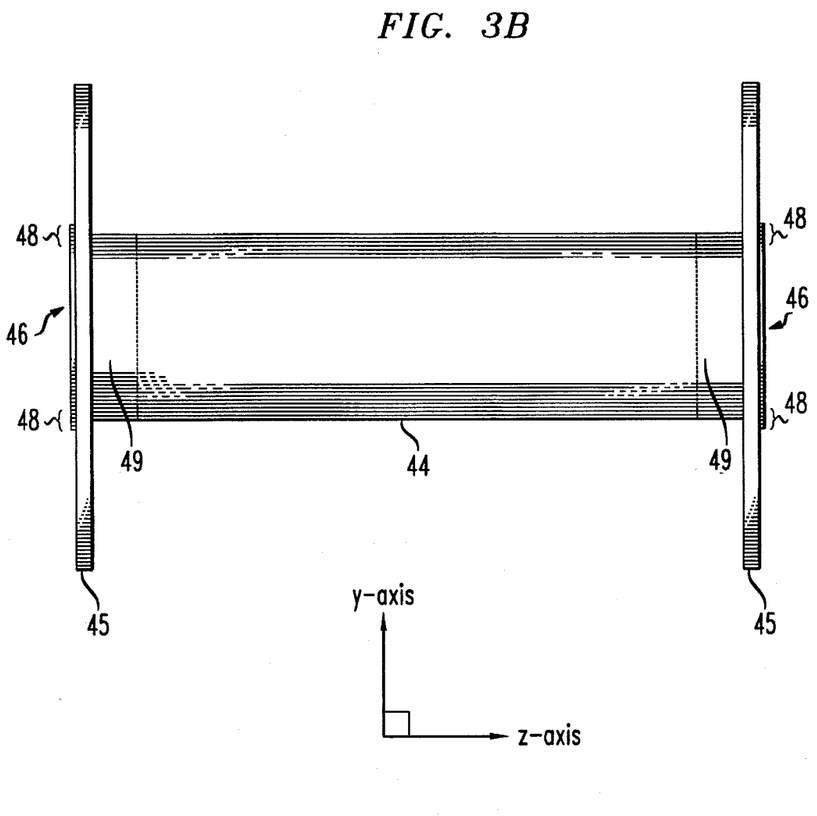
FIG. 3B is a second side view of the spool assembly in accordance with the present invention.

In FIGS. 3A and 3B, the spool assembly of the present invention includes a spool 44, two flanges 45 and two end plugs 46. The spool 44 is a tube made of a material such as paperboard. The two flanges 45 are annular-shaped with centered annular openings and made from a material such as chipboard. The flanges 45 can include a start hole 47 that receives an end of the optic fiber cable, wire or the like, to be wound on the spool 44, and holds the end so that the winding process can be readily started. The flanges 45 are held in position at either open end of the spool 44 with respective end plugs 46 composed of polystyrene or other suitable material. The end plug 46 includes a flange 48 (which is an annular-shaped element extending radially from 2¹¹⁄₁₆" to 3⁷⁄₁₆" as indicated in FIG. 3A). The flange 48 is concentric with and integrally formed at an end of a cylinder 49. The cylinder 50 with a smaller diameter than that of the cylinder 49, is held in concentric alignment with the cylinder 50 by spokes 51 that radially extend and meet perpendicularly with the surfaces of cylinders 49, 50. The cylinder 49 extends in the same direction that the cylinder 50 extends.

The spool assembly is assembled by aligning the two flanges 45 with respective open ends of the spool 44. The outer surface of the cylinders 49 of respective end plugs 46 are then inserted through the centered openings of flanges 45 and into the ends of the spool 44 (the extreme ends of the cylinders 49 inside of the spool 44 are illustrated with broken lines in FIG. 3B). The cylinders 49 are sized to be snugly seated when inserted into the ends of the spool 44, to hold the spool assembly firmly together.

Figure 4:
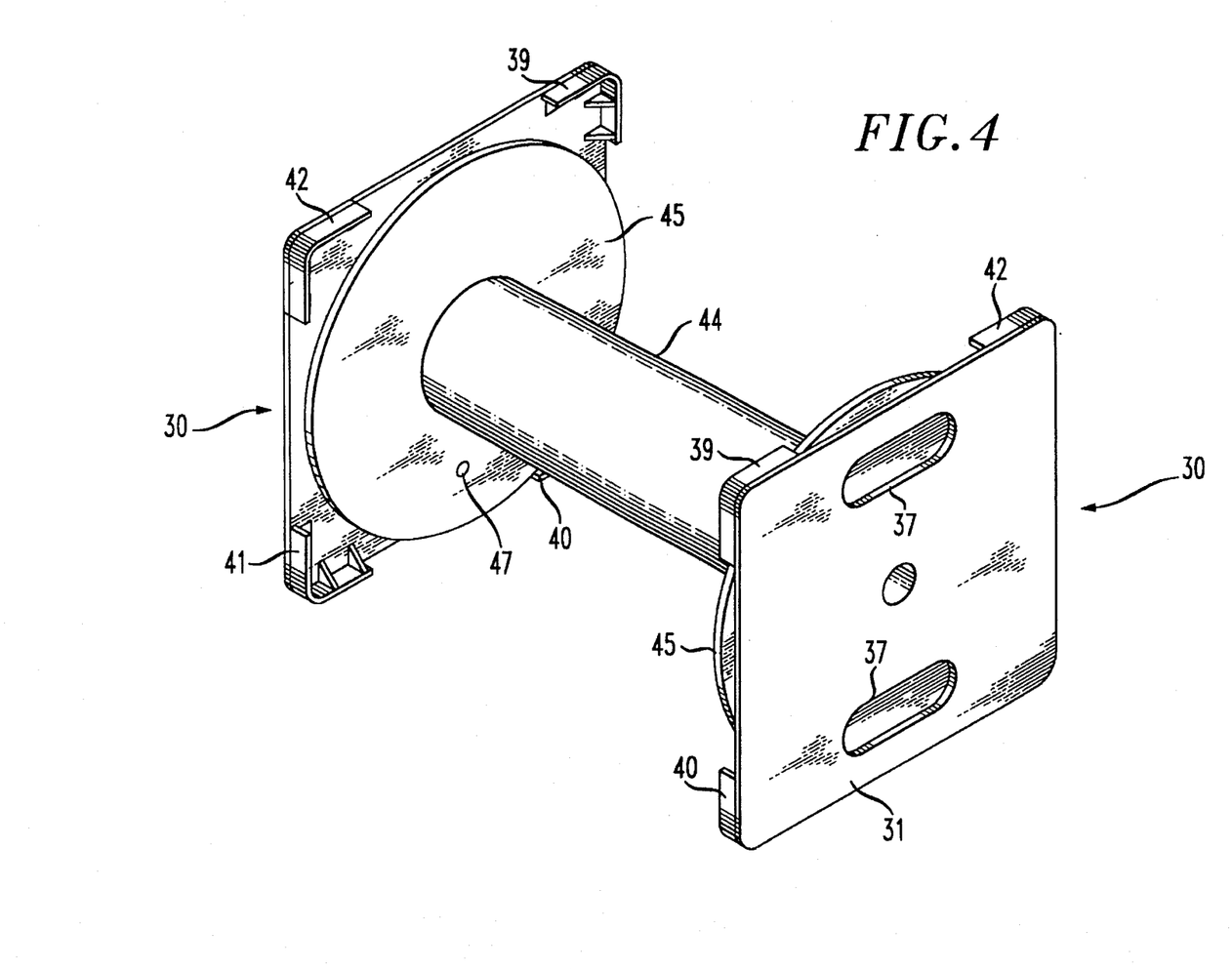
FIG. 4 is a perspective view of the spool assembly supported at both ends by respective end plates in accordance with the present invention.
Figure 5:
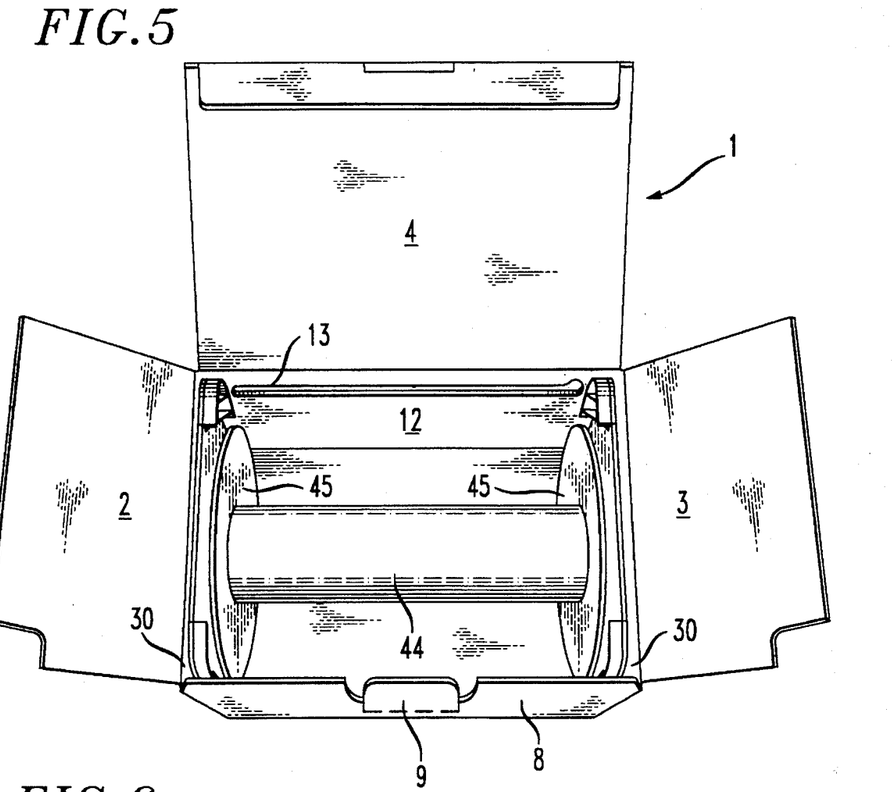
FIG. 5 is a perspective view of the spool assembly placed inside of a box in accordance with the present invention.

The spool assembly, the end plates 30 and the box 1, are assembled together as follows. The spool assembly is loaded with optic fiber cable, wire or the like by inserting the end of the cable or wire into the start hole 47 over the flanges 45, and winding cable or wire, etc. on the spool 44 about its rotational axis. The two end plates 30 are then brought into alignment with respective sides of the spool assembly, and respective protrusions 34 are inserted into the open ends of the respective cylinders 50. The spool assembly is thus supported at its ends by the end plates 30. The assembled end plates 30 and spool assembly are as shown in FIG. 4 (in FIG. 4, the spool 44 is not shown with the wire or cable wound thereon to provide better viewing of the present invention). The box 1 is assembled leaving the top side open, as previously explained. The spool assembly with supporting end plates 30 is then placed in the box 1, as shown in FIG. 5. Again, in FIG. 5, the spool 44 does not have wire or cable wound thereon to better show the features of the present invention, but the spool 44 would of course be fully-wound with cable or wire before shipment. The size of the box 1 is such that the end plates 30 hold the end plates 30 so that the spool assembly cannot slip off of the respective protrusions 34 of the end plates 30. The loose end of the cable or wire is passed out of the box 1 through the starburst cut 16 and back into the box through the starburst cut 17. The top flaps 2 and 3 are then folded inward, the top lid 4 folded downward and locked in position by inserting the folding tab 9 into the slot 29. The boxed spool assembly of the present invention is thus ready for shipment.

Figure 6:
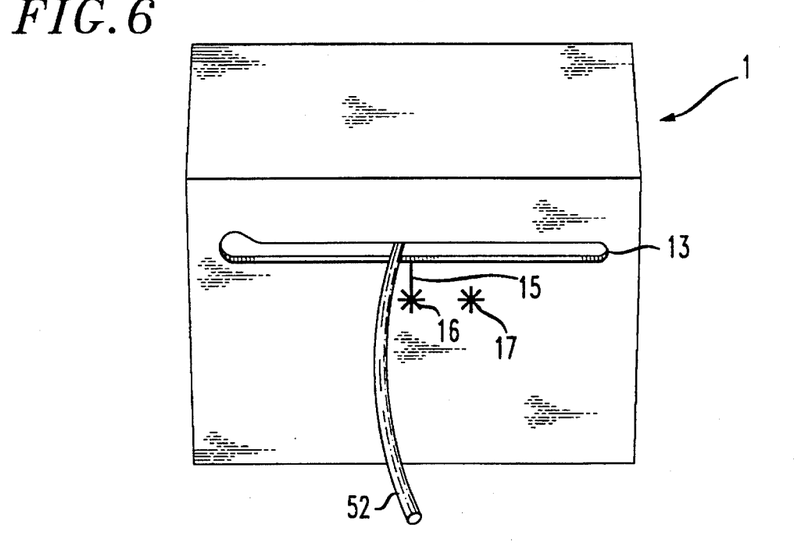
FIG. 6 is a perspective view of a box enclosing a spool with optic fiber cable or the like wound thereon, with a loose end of the cable or the like protruding from a horizontal slot in the box in accordance with the present invention.

In operation, a user transports the box 1 using the convenient, secure handholds provided by openings 7, 11 in conjunction with respective openings 37. When a user (such as a cable or wire installer) wishes to extract the boxed wire or cable, the user pushes with a finger against punch hole area 14 to break perforations in the side panel 12 and then pulls the punch hole area 14 outward to tear open the slot 13. The user then pulls the loose end of the cable or wire out of the starburst cut 17, and then pulls upwardly to pass the cable or wire 52 through the slit 15 to the slot 13, resulting in the arrangement shown in FIG. 6. The user then pulls out a desired length of cable or wire 52 with the smooth pay-out made possible by the present invention. Once the desired length is obtained, the user can pull the cable or wire 52 downward through slit 15 to be held in starburst cut 16 preparatory to cutting the cable or wire 52.

Although the invention has been described with specific illustrations and embodiments, it will be clear to those of ordinary skill in the art that various modifications may be made therein without departing from the spirit and scope of the invention as outlined in the following claims.

I claim:

1. An apparatus comprising:

a spool assembly having first and second flanges;

first and second end plates supporting respective ends of the spool assembly to allow rotation of the spool assembly;

means for maintaining the first and second flanges of the spool assembly in a spaced relationship from plate surfaces of the first and second end plates; and a box enclosing the spool assembly and the first and second end plates;

the first and second end plates having openings aligned with openings in the box, to provide handholds for a user.

2. An apparatus as claimed in claim 1, wherein said first and second end plates include respective corner supports.

3. An apparatus as claimed in claim 2, wherein said corner supports are supported by respective ribs of said first and second end plates.

4. An apparatus as claimed in claim 1, wherein said means for maintaining includes arbors formed in said first and second end plates, that protrude away from respective surfaces of said surfaces of said first and second end plates so that flanges included within said spool assembly, do not contact the respective plate surfaces of said first and second end plates.

5. An apparatus as claimed in claim 1, wherein said means for maintaining includes respective arbors formed in said first and second end plates, with flat annular ledge surfaces that maintain the spool assembly in spaced relation to the respective plate surfaces of said first and second end plates.

6. An apparatus as claimed in claim 1, wherein said means for maintaining includes respective arbors formed in said first and second end plates, with protrusions drafted to center said spool assembly in said box.

7. An apparatus as claimed in claim 1, wherein said first and second end plates are formed of polycarbonate material.

8. An apparatus as claimed in claim 1, wherein said means for maintaining includes respective arbors formed in said first and second end plates, and supported by ribs.

9. An apparatus as claimed in claim 1, wherein said box includes a first bottom flap adjacent to a first major side panel of the box, the first bottom flap having two protruding tabs separated and defined by a cutaway portion therebetween, and further defined by respective cutaway portions on respective minor sides of the first bottom flap, the portion of the first bottom flap between the two protruding tabs receiving and holding a tab of a second bottom flap adjacent to a second major side panel of the box and separated therefrom by a fold line.

10. An apparatus as claimed in claim 1, wherein a bottom side of said box is self-locking.

11. An apparatus as claimed in claim 1, wherein said box includes a horizontal slot defined by perforations on the box.

12. An apparatus as defined in claim 11, wherein said box includes a punch hole area at one end of the slot.

13. An apparatus as claimed in claim 11, wherein said box has a vertical slit with a first end meeting with the slot, and a first starburst cut at a second end of the vertical slit.

14. An apparatus as claimed in claim 13, wherein said box has a second starburst slit spaced from the first starburst cut.

15. An apparatus as claimed in claim 1, wherein said box measures roughly 10½"×14"×10½".

16. An apparatus as claimed in claim 14, wherein said box measures 10⅛" ×13¾"×10⅜".

17. An apparatus comprising:

a spool assembly having first and second flanges;

first and second end plates supporting respective ends of the spool assembly to allow rotation of the spool assembly;

means for maintaining the first and second flanges of the spool assembly in a spaced relationship from plate surfaces of the first and second end plates;

a box enclosing the spool assembly and the first and second end plates, the box having a horizontal slot defined by perforations on the box, the box having a vertical slit with a first end meeting with the slot, and the box having a first starburst cut at a second end of the vertical slit.

18. An apparatus as claimed in claim 17, wherein said first and second end plates include respective corner supports.

19. An apparatus as claimed in claim 18, wherein said corner supports are supported by respective ribs of said first and second end plates.

20. An apparatus as claimed in claim 17, wherein said means for maintaining includes arbors formed in said first and second end plates, that protrude away from respective surfaces of said surfaces of said first and second end plates so that flanges included within said spool assembly, do not contact the respective plate surfaces of said first and second end plates.

21. An apparatus as claimed in claim 17, wherein said means for maintaining includes respective arbors formed in said first and second end plates, with flat annular ledge surfaces that maintain the spool assembly in spaced relation to the respective plate surfaces of said first and second end plates.

22. An apparatus as claimed in claim 17, wherein said means for maintaining includes respective arbors formed in said first and second end plates, with protrusions drafted to center said spool assembly in said box.

23. An apparatus as claimed in claim 17, wherein said first and second end plates are formed of polycarbonate material.

24. An apparatus as claimed in claim 17, wherein said first and second end plates have openings aligned with openings in said box, to provide handholds for a user.

25. An apparatus as claimed in claim 17, wherein said means for maintaining includes respective arbors formed in said first and second end plates, and supported by ribs.

26. An apparatus as claimed in claim 17, wherein said box includes a first bottom flap adjacent to a first major side panel of the box, the first bottom flap having two protruding tabs separated and defined by a cutaway portion therebetween, and further defined by respective cutaway portions on respective minor sides of the first bottom flap, the portion of the first bottom flap between the two protruding tabs receiving and holding a tab of a second bottom flap adjacent to a second major side panel of the box and separated therefrom by a fold line.

27. An apparatus as claimed in claim 17, wherein a bottom side of said box is self-locking.

28. An apparatus as claimed in claim 17, wherein said box includes a horizontal slot defined by perforations on the box.

29. An apparatus as defined in claim 28, wherein said box includes a punch hole area at one end of the slot.

30. An apparatus as claimed in claim 17, wherein said box has a second starburst slit spaced from the first starburst cut.

31. An apparatus as claimed in claim 30, wherein said box measure 10⅛"×13¾" ×10⅜".

32. An apparatus as claimed in claim 17, wherein said box measures roughly 10½" ×14×10½".

33. An apparatus comprising:

a spool assembly having first and second flanges;

first and second end plates supporting respective ends of the spool assembly to allow rotation of the spool assembly;

means for maintaining the first and second flanges of the spool assembly in a spaced relationship from plate surfaces of the first and second end plates; and a box enclosing the spool assembly and the first and second end plates, said box including a first bottom flap adjacent to a first major side panel of the box, the first bottom flap having two protruding tabs separated and defined by a cutaway portion therebetween, and further defined by respective cutaway portions on respective minor sides of the first bottom flap, the portion of the first bottom flap between the two protruding tabs receiving and holding a tab of a second bottom flap adjacent to a second major side panel of the box and separated therefrom by a fold line, and the first bottom flap being defined by the respective cutaway portions on the respective minor sides of the first bottom flap to allow clearance for rotation of respective first and second flanges of said spool assembly.

34. An apparatus comprising:

a spool assembly having first and second flanges;

first and second end plates supporting respective ends of the spool assembly to allow rotation of the spool assembly;

means for maintaining the first and second flanges of the spool assembly in a spaced relationship from plate surfaces of the first and second end plates; and a box enclosing the spool assembly and the first and second end plates, the box including a first bottom flap adjacent to a first major side panel of the box and separated therefrom by a fold line, the first bottom flap having two protruding tabs separated and defined by a cutaway portion therebetween, and further defined by respective cutaway portions on respective minor sides of the first bottom flap, a second bottom flap adjacent to a second major side panel of the box and separated therefrom by a fold line, the second bottom flap having a tab, a third bottom flap adjacent to a first minor side panel of the box and separated therefrom by a fold line, and a fourth bottom flap adjacent to a second minor side panel of the box and separated therefrom by a fold line, the first, second, third and fourth bottom flaps being foldable at respective fold lines to define the bottom of said box, the portion of the first bottom flap between the two protruding tabs receiving and holding the tab of the second bottom flap to hold together the first, second, third and fourth bottom flaps when folded, and the third and fourth bottom flaps, when folded, covering respective cutaway portions on respective minor sides of the first bottom flap, the first bottom flap being defined by the cutaway portions on the respective minor sides of the first bottom flap to allow clearance for rotation of respective first and second flanges of said spool assembly.

* * * * *